Jan. 13, 1925.
B. H. HOWARD ET AL
1,523,208
FEEDER FOR INGOT MOLDS
Filed Nov. 1, 1924
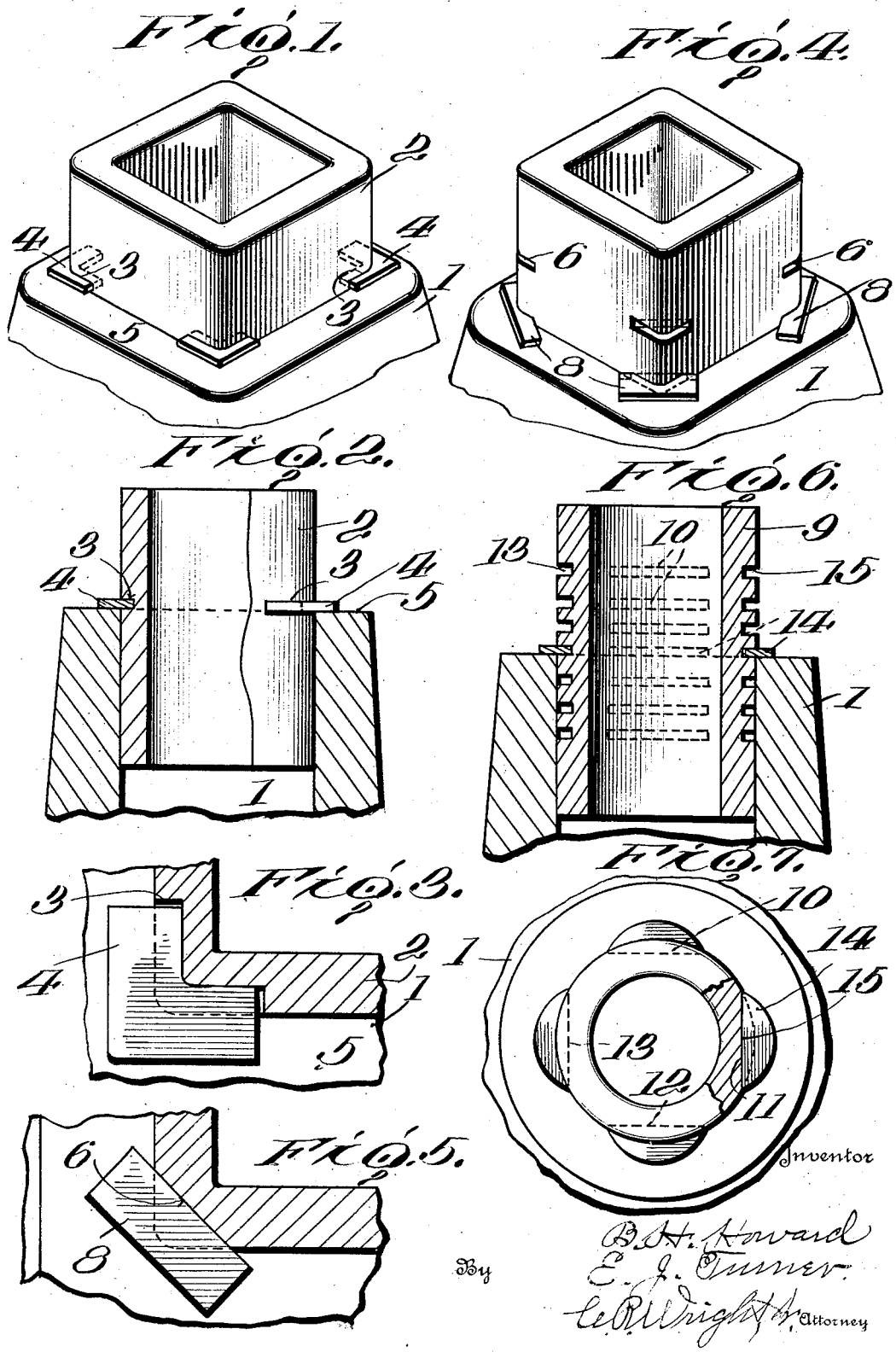

Patented Jan. 13, 1925.

1,523,208

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed November 1, 1924. Serial No. 747,330.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds used in the manufacture of iron or steel ingots and has for its object the prevention of holes and seams in the upper end of the ingot known as "piping" and at the same time produce a feeder which will reduce segregation to a minimum.

Another object of our invention is to provide a feeder made of tubular form having a perfectly plain exterior surface with no projection, whereby the feeder may extend a greater or less distance into the mold, or either end placed within the bore of the mold and to provide means whereby the feeder is supported upon the upper end of the mold.

A further object of our invention is to provide a feeder of this character in which the outer face, at its corners is provided with kerfs adapted to receive supporting plates which rest upon the upper end of the mold and whereby the feeder is supported upon the mold in any of its adjusted positions or in its reversible position.

A still further object of our invention is to provide a simple, cheap and effective feeder of this character having certain details of structure and combination of parts hereinafter more fully set forth.

In the accompanying drawings:

Figure 1 is a perspective view of a mold showing our improved feeder supported therein.

Figure 2 is a vertical transverse sectional view of Figure 1.

Figure 3 is an enlarged horizontal sectional view of one corner of the mold showing our improved supporting plate in position.

Figure 4 is a perspective view of an ingot mold showing a modified form of feeder and supporting means applied thereto.

Figure 5 is an enlarged horizontal sectional view of one corner of the feeder showing the form of feeder and supporting means shown in Figure 4.

Figure 6 is a transverse vertical sectional view of a circular mold and feeder showing means whereby the feeder may be allowed to extend a greater or less distance into the mold or can be reversed with either end of the feeder within the bore of the mold.

Figure 7 is a top plan view partly broken away of Figure 6.

Referring now to the drawings, 1 represents the mold and 2 the feeder. The feeder 2 as shown, is of a rectangular form having its outer face perfectly smooth and the exterior diameter of the feeder is slightly less than the bore of the mold so that it can readily enter the same. Each corner of the feeder is provided with a kerf 3 which extends in two directions along the two side walls extending from the corner. Placed in these kerfs are the angular supporting plates 4 preferably made of metal and which extend out beyond the kerf and rest upon the upper edge 5 of the mold and whereby the feeder is supported within the upper end of the mold.

In the modification shown in Figures 4 and 5 the kerfs 6 extend obliquely across the corner of the feeder 7 and the supporting plates 8 are of a rectangular flat form arranged diagonally in respect to the walls of the feeder.

In the modification shown in Figure 6, the feeder 9 is of a circular form and is provided with four kerfs 10, 11, 12 and 13 oppositely arranged as clearly shown in Figure 7 of the drawings. In this form there are a number of these kerfs one above the other, in order that the feeder may be allowed to extend a greater or less distance into the bore of the mold. The supporting plates 14 are of a circular form having the flat edge 15 adapted to enter the kerfs 10, 11, 12 and 13 and extend out over the upper end of the mold and to support the feeder therein in the same manner as that referred to in the other forms.

Having thus fully described our invention what we claim is:—

1. A feeder for ingot molds comprising a body portion having apertures at its corners and adapted to receive supporting means.

2. A feeder for ingot molds comprising a body portion of refractory material having kerfs in its outer face for receiving supporting means.

3. A feeder for ingot molds comprising a body portion of refractory material having kerfs for receiving supporting plates which extend over the upper end of the mold.

4. A feeder for ingot molds comprising a body portion of refractory material having kerfs arranged at the corners, and supporting plates entering said kerfs and extending outwardly over the upper end of the mold.

5. A feeder for ingot molds comprising a body portion of refractory material having kerfs at its corners and angular supporting plates entering said kerfs and extending over the upper end of the mold.

6. A feeder for ingot molds comprising a body portion of refractory material having kerfs in the four oppositely arranged walls, and supporting plates entering said kerfs and extending over the upper end of the mold.

7. A feeder for ingot molds comprising a body portion of refractory material having a series of rows of oppositely arranged kerfs, and supporting plates entering said kerfs and extending outwardly over the upper end of the mold.

In testimony whereof we affix our signatures.

BLOOMFIELD H. HOWARD.
ERNEST J. TURNER.